(12) United States Patent
Hyden et al.

(10) Patent No.: US 7,360,211 B2
(45) Date of Patent: Apr. 15, 2008

(54) SYSTEM FOR AUTOMATED GENERATION OF CONFIG TO ORDER SOFTWARE STACKS

(75) Inventors: William P. Hyden, Round Rock, TX (US); Gaston M. Barajas, Austin, TX (US); Gavin T. Smith, Kyle, TX (US); Thomas Vrhel, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 822 days.

(21) Appl. No.: 10/609,924

(22) Filed: Jun. 30, 2003

(65) Prior Publication Data

US 2004/0268342 A1    Dec. 30, 2004

(51) Int. Cl.
 G06F 4/445    (2006.01)
 G06F 12/00    (2006.01)
 G06F 15/167   (2006.01)

(52) U.S. Cl. .................. 717/174; 711/153; 709/215
(58) Field of Classification Search .................. None
  See application file for complete search history.

(56) References Cited

U.S. PATENT DOCUMENTS

| | | | | |
|---|---|---|---|---|
| 5,991,543 | A | 11/1999 | Amberg et al. | 395/712 |
| 5,995,757 | A | 11/1999 | Amberg et al. | 395/712 |
| 6,064,387 | A | 5/2000 | Canaday et al. | 345/357 |
| 6,151,643 | A * | 11/2000 | Cheng et al. | 710/36 |
| 6,182,275 | B1 | 1/2001 | Beelitz et al. | 717/1 |
| 6,202,070 | B1 | 3/2001 | Nguyen et al. | 717/104 |
| 6,236,901 | B1 | 5/2001 | Goss | 700/95 |
| 6,247,128 | B1 | 6/2001 | Fisher et al. | 713/100 |
| 6,262,726 | B1 | 7/2001 | Stedman et al. | 345/333 |
| 6,298,427 | B1 | 10/2001 | Beelitz | 711/173 |
| 6,298,443 | B1 | 10/2001 | Colligan et al. | 713/200 |
| 6,327,706 | B1 | 12/2001 | Amberg et al. | 717/11 |
| 6,385,766 | B1 * | 5/2002 | Doran et al. | 717/174 |
| 6,425,078 | B1 | 7/2002 | Smith et al. | 713/1 |
| 6,427,091 | B1 | 7/2002 | Davis et al. | 700/115 |
| 6,487,522 | B1 | 11/2002 | Smith et al. | 702/186 |
| 6,505,094 | B2 | 1/2003 | Pape et al. | 700/217 |
| 6,516,242 | B1 | 2/2003 | Brown | 700/216 |
| 6,519,762 | B1 | 2/2003 | Colligan et al. | 717/11 |
| 6,543,047 | B1 | 4/2003 | Vrhel, Jr. et al. | 717/121 |

(Continued)

OTHER PUBLICATIONS

"IBM Thinkpad A30p (aengus)",http://www.astro.uiuc.edu/~pmricker/interests/computers/a30p.html, pp. 1-6, Sep. 16, 2002.*

(Continued)

*Primary Examiner*—Mary Steelman
*Assistant Examiner*—Chih-Ching Chow
(74) *Attorney, Agent, or Firm*—Hamilton & Terrile, LLP; Stephen A. Terrile (57) ABSTRACT

A method for automatically generating a software stack in an information handling system. The information handling system includes a software process partition. The method includes generating a manifest identifying software stack contents, creating a target partition within the information handling system, installing the specified software stack components into the target partition, configuring the target partition as active and bootable and the software process partition as hidden, booting into the target partition, setting up and configuring the software components within the target partition, and configuring the software process partition as active and bootable and the target partition as inactive. The generated software stack optionally may be captured for later use.

22 Claims, 6 Drawing Sheets

U.S. PATENT DOCUMENTS

| | | | |
|---|---|---|---|
| 6,550,062 B2 | 4/2003 | Barajas et al. | 717/178 |
| 6,591,418 B2 | 7/2003 | Bryan et al. | 717/177 |
| 6,681,392 B1* | 1/2004 | Henry et al. | 717/176 |
| 6,883,168 B1* | 4/2005 | James et al. | 717/178 |
| 2004/0250247 A1* | 12/2004 | Deeths et al. | 717/175 |

OTHER PUBLICATIONS

"PC fdisk Partitions and Unix", pp. 1-3, "http://www.mobiledyne.com/pub/pcfdisk.html", Sep. 16, 1999.*

* cited by examiner

SYSTEM FOR AUTOMATED GENERATION OF CONFIG TO ORDER SOFTWARE STACKS

BACKGROUND OF THE INVENTION

1. Field of the Invention

The present invention relates to the field of information handling systems and more particularly to automated generation of configurable software images.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

It is known to install software and to perform tests on information handling systems before they are shipped to businesses or individual customers. A goal of software installation is to efficiently produce a useful, reliable information handling system. Software installation often includes loading a desired package of software onto the information handling, preparing appropriate environment variables for the computer, and preparing appropriate initialization files for the loaded software.

When installing hardware and software onto multiple information handling systems in a manufacturing environment, identifying a unique software or hardware order across multiple information handling systems is desirable. A software order is unique if all the software parts and parameters that are installed in a system are unique in combination. A hardware order is unique when all of the hardware parts of that order are unique in combination.

Installable images have been identified as a means for reducing system setup times while also providing well tested, self contained packages to be deployed as a whole to a client system. To support flexibility in a build to order environment, a large number of images need to be created and refreshed. This is especially important when a new version of an operating system becomes available.

Accordingly, it is desirable to provide a system in which images are provided in a consistently reproducible fashion. It is also desirable to provide the ability of automatically generating images, thus allowing images to be created continuously and then tested when schedules permit.

In known systems, images are created using operators to setup a machine by hand using install CDs for the operating system and applications. The system is then configured as desired. The image is then created using a software tool such as that available from Norton under the trade designation "Ghost" or from Powerquest under the trade designation "Drive Image Pro (PQI)".

SUMMARY OF THE INVENTION

In accordance with the present invention, a system is described which is capable of downloading and installing a configurable set of software parts (i.e., a software stack) and then automatically capturing an image of the software stack, optionally uploading the image to a shared server for later use. The images may include one or more of fixed images, base images and self configuring images.

The present invention relates to a method for automatically generating a software stack in an information handling system. The information handling system includes a software process partition. The method includes generating a manifest identifying software stack contents, creating a target partition within the information handling system, installing the specified software stack contents into the target partition, configuring the target partition as active and bootable and the software process partition as hidden, booting into the target partition, setting up and configuring the software stack components in the target partition, and configuring the software process partition as active and bootable and the target partition as inactive.

In another embodiment, the invention relates to an apparatus for automatically generating a software stack in an information handling system. The information handling system includes a software process partition. The apparatus includes means for generating a manifest identifying software stack contents, means for creating a target partition within the information handling system, means for installing the specified software stack contents into the target partition, means for configuring the target partition as active and bootable and the software process partition as hidden, means for booting into the target partition, means for setting up and configuring the software stack components in the target partition, and means for configuring the software process partition as active and bootable and the target partition as inactive.

In another embodiment, the invention relates to a system for automatically generating a software stack in an information handling system. The information handling system includes a software process partition. The system includes a generating module, a creating module, an installing module, a target configuring module, a booting module, a software stack setup and configuring module, and a software process configuring module. The generating module generates a manifest identifying software stack contents. The creating module creates a target partition within the information handling system. The installing module installs the software stack onto the target partition. The target configuring module configures the target partition as active and bootable and the software process partition as hidden. The booting module boots into the target partition. The software stack setup and configuring module sets up and configures the software in the target partition. The software process configuring module configures the software process partition as active and bootable and the target partition as inactive.

In another embodiment, the invention relates to an information handling system comprised for automatically generating a software stack. The information handling system includes a software process partition. The system includes a processor; memory coupled to the processor, a generating module, a creating module, an installing module, a target configuring module, a booting module, a software stack setup and configuring module, and a software process configuring module. The memory includes a software process partition and a target partition. The generating module generates a manifest identifying software stack contents. The creating module creates a target partition within the information handling system. The installing module installs the software stack onto the target partition. The target configuring module configures the target partition as active and bootable and the software process partition as hidden. The booting module boots into the target partition. The software stack setup and configuring module sets up and configures the software in the target partition. The software process configuring module configures the software process partition as active and bootable and the target partition as inactive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
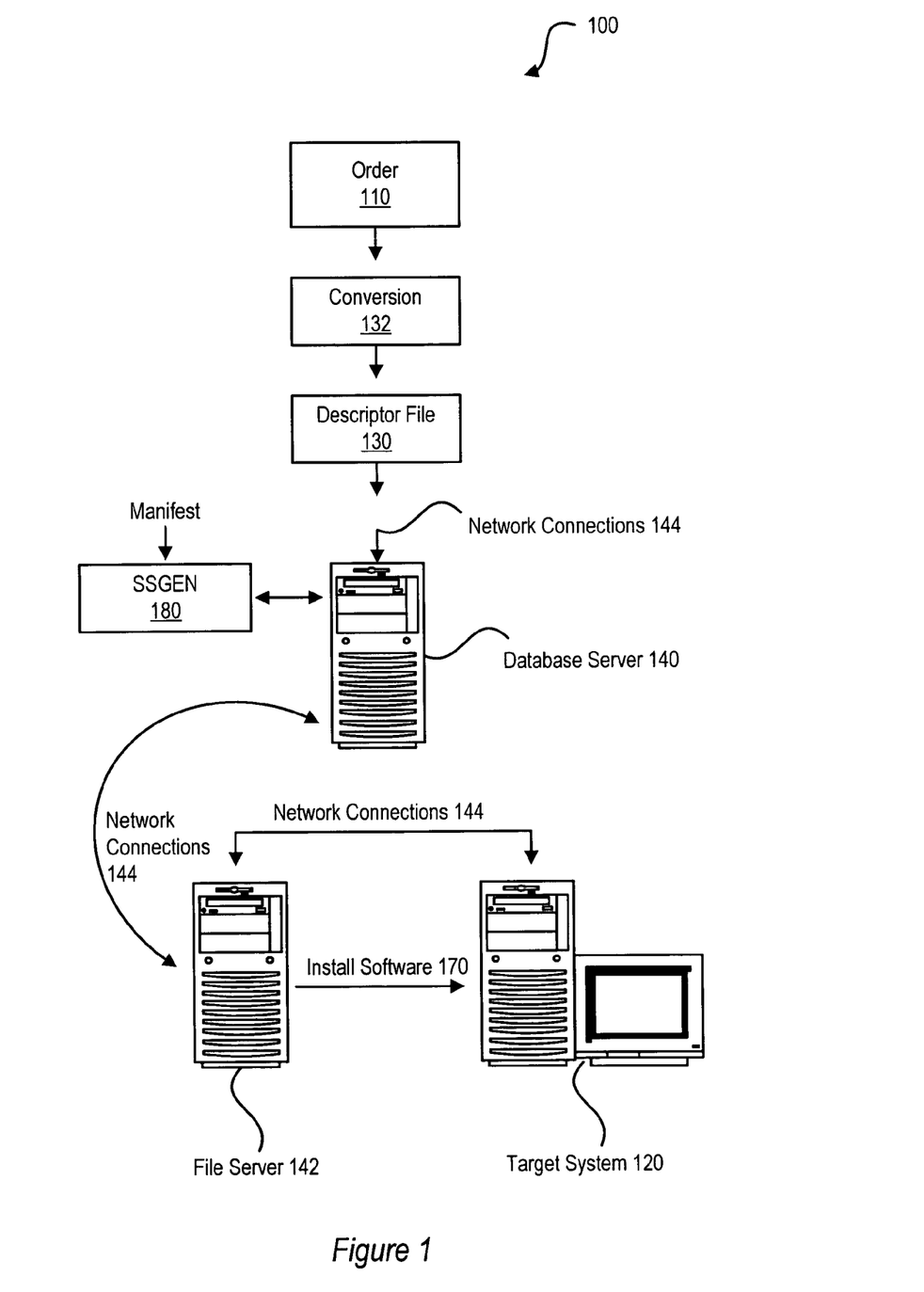
FIG. 1 shows a schematic diagram of a system for installing software.

FIG. 1 is a schematic diagram of a software installation system 100 at an information handling system manufacturing site. In operation, an order 110 is placed to purchase a target information handling system 120. The target information handling system 120 to be manufactured contains a plurality of hardware and software components. For instance, target information handling system 120 might include a certain brand of hard drive, a particular type of monitor, a certain brand of processor, and software. The software may include a particular version of an operating system along with all appropriate driver software and other application software along with appropriate software bug fixes. Before target information handling system 120 is shipped to the customer, the plurality of components are installed and tested. Such software installation and testing advantageously ensures a reliable, working information handling system which is ready to operate when received by a customer.

Because different families of information handling systems and different individual computer components may require different software installations, it is desirable to determine which software to install on a target information handling system 120. A descriptor file 130 is provided by converting an order 110, which corresponds to a desired information handling system having desired components, into a computer readable format via conversion module 132.

Component descriptors are computer readable descriptions of the components of target information handling system 120 which components are defined by the order 110. In a preferred embodiment, the component descriptors are included in a descriptor file called a system descriptor record which is a computer readable file containing a listing of the components, both hardware and software, to be installed onto target information handling system 120. Having read the plurality of component descriptors, database server 140 provides a plurality of software components corresponding to the component descriptors to file server 142 over network connection 144. Network connections 144 may be any network connection well-known in the art, such as a local area network, an intranet, or the internet. The information contained in database server 140 is often updated such that the database contains a new factory build environment. The software is then installed on the target information handling system 120 via file server 142.

The database server 140 may also be updated via a software stack generator machine 180. The software stack generator (SSGEN) machine 180 is capable of downloading and installing a configurable set of software parts and then automatically capturing an image of the contents, optionally uploading the image to a shared server such as the database server 140 for later use. The software stack generator machine 180 is capable of being controlled by a centralized front end, thus allowing two or more software stack generator machines to be set up in an image building farm.

In operation, the automating the generation of images provides the ability to download the parts to be installed into the image from a network or other storage device. The software stack generator machine 180 may include scriptable package delivery mechanisms.

Images to be created are described using a manifest which is represented, e.g., as an XML document. The contents of the image include some or all of a base operating system, application programs, applets (for hardware), etc. The manifest is provided to the software stack generator machine 142 and causes the image building process to begin. After the image is created, the image can be installed onto a target system such that the building of the image is transparent to the target system. For example, the SSGEN machine 180 removes anything from the registry of the operating system that would indicate that the software stack was created by the SSGEN machine.

Figure 2:
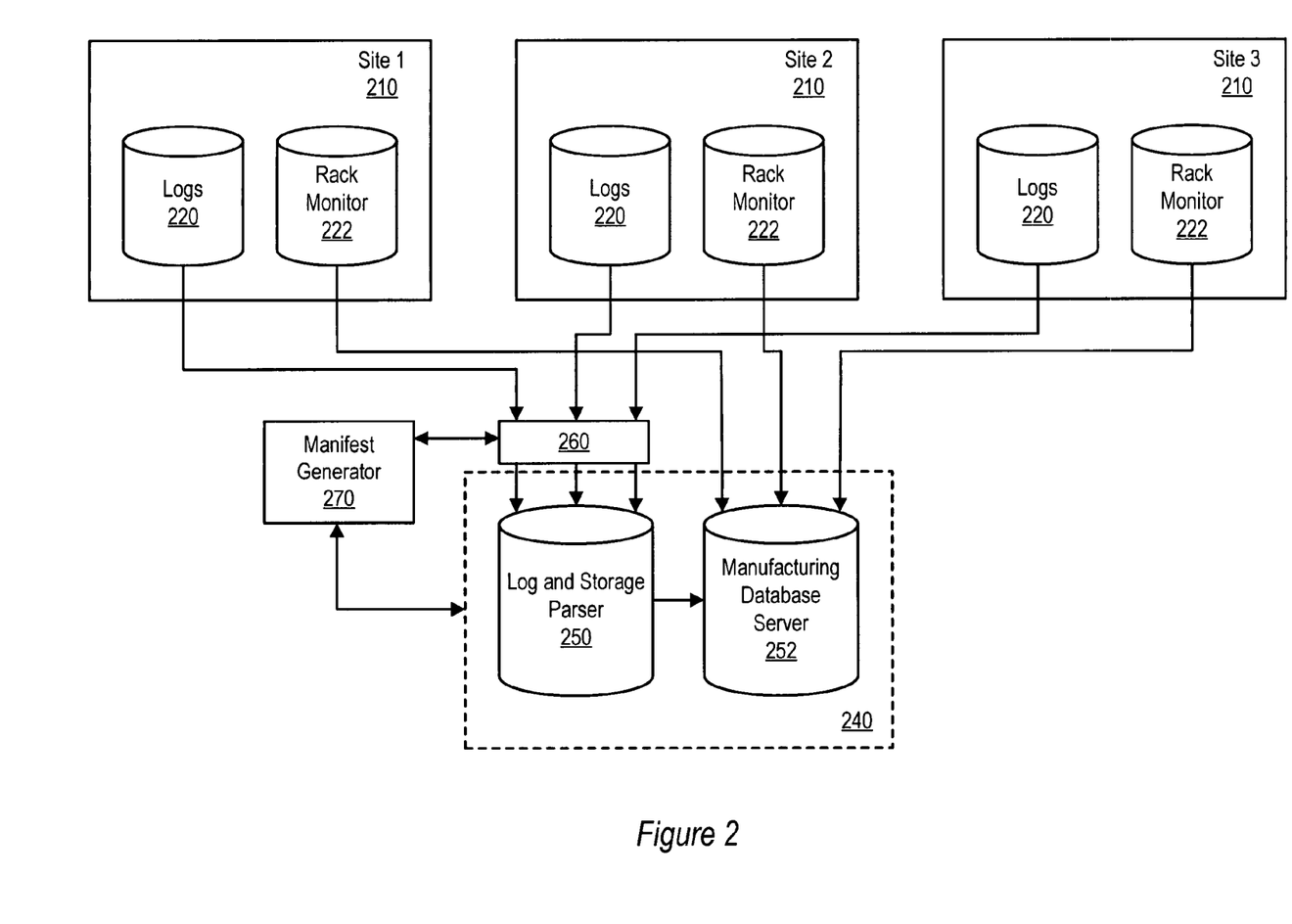
FIG. 2 shows a block diagram of a plurality of manufacturing sites providing information relating to orders.

Referring to FIG. 2, a block diagram of a plurality of manufacturing sites providing information relating to orders and a system for automated generation of config to order software stacks is shown. More specifically, the plurality of manufacturing sites 210 each include a respective log database 220 and burn rack monitor database 222. Information from the log databases 220 and the burn rack monitor databases 222 are provided to an order storage system 240. The order storage system includes a log storage and parser server 250 and a manufacturing database server 252. The log storage and parser server 250 and the manufacturing database server 252 may be located on one or more servers. The log storage and parser server 250 receives information from the log databases 220 and the manufacturing database server 252 receives information from the burn rack monitor database 222. The information that is provided to the log storage and parser database 250 passes through a system for calculating and identifying unique orders 260.

The system for calculating and identifying unique orders 260 packages a plurality of different system configurations in a unique and easily identifiable identifier. Providing a unique and easily identifiable identifier for each unique order configuration enables analysis of the order configuration to determine the frequency of certain order configurations as well as ranking of certain order configurations. Such identification and ranking enables pre-combination of certain commonly ordered configurations so as to expedite the manufacturing and loading process.

A manifest generator 270 is coupled to the order storage system 240 to obtain information for generating manifests. The system for calculating and identifying unique orders 260 may provide information to a manifest generator 270. The manifest generator 270, which generates the manifests for input to the SSGEN machine 180, may use the information from the system for calculating and identifying unique orders 260 to prioritize the generation of manifests and thus the creation of software stacks by the SSGEN machine 180.

Figure 3:
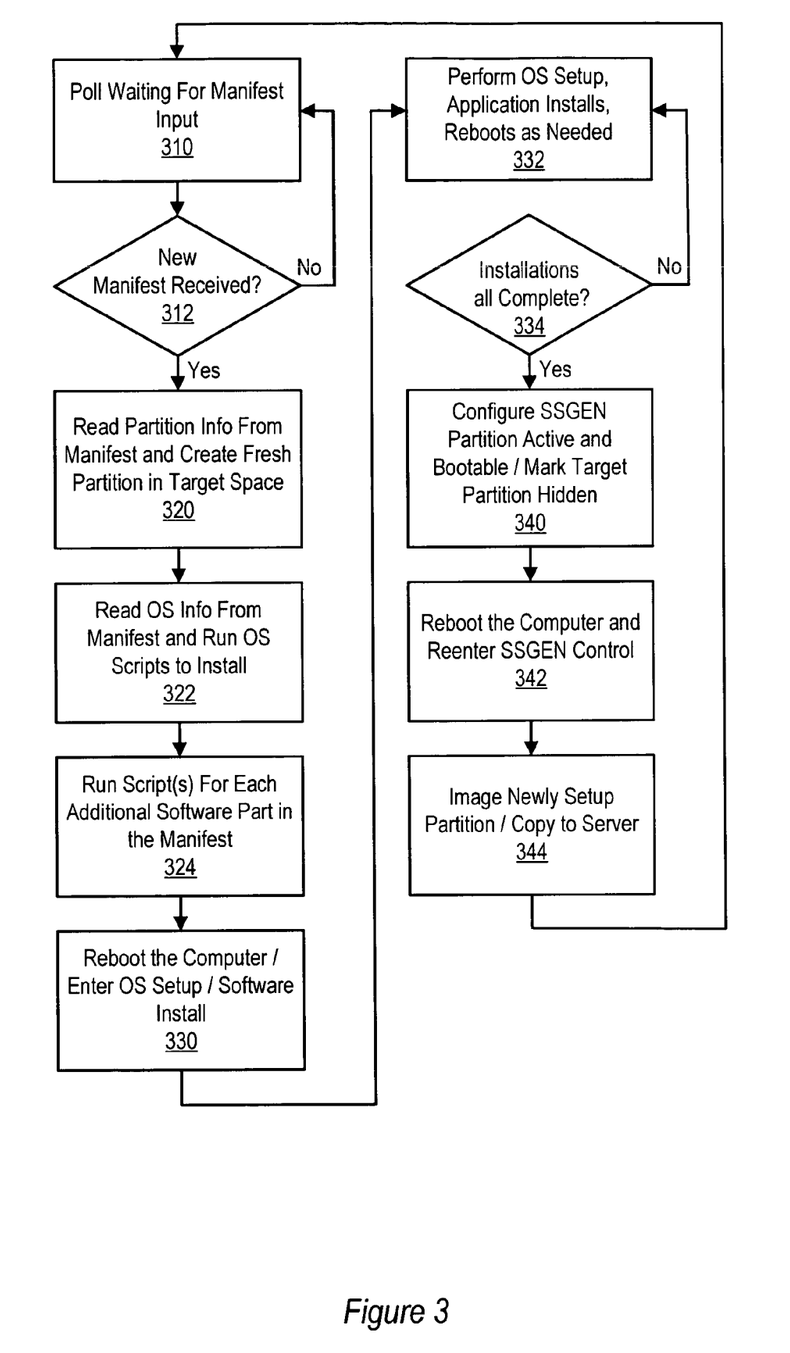
FIG. 3 shows a flow chart of the operation of a system for software stack generation.

Referring to FIG. 3, a flow chart of the operation of a system for software stack generation is shown. More specifically, the system for software stack generation polls the manifest generator 270 waiting for a manifest input at step 310 and determines whether a new manifest has been received at step 312. If no manifest is received, then the system returns to again poll for a manifest input at step 310.

If a manifest is received, then the system 180 reads partition information from the manifest and creates a target partition in the scratch space of the system at step 320. The scratch space of the system represents free or unallocated space within the hard drive or other non-volatile memory. The target partition within the scratch space is sufficiently sized so as to enable the loading of the software stack. Next the system 180 reads operating system information from the manifest and executes operating system scripts to install the operating system at step 322. Next the system 180 executes scripts for each additional software part in the manifest at step 324.

After all of the specified software is installed onto the computer's target partition, the target partition is marked as active and the software process partition is marked as hidden. The system reboots the computer and enters the target operating system setup and software install at step 330. The system then performs the operating system setup, driver, and application installs and reboots the computer as needed for the operating system setup, driver, and application installs at step 332. The system 180 then determines whether all of the installations are complete at step 334. If not, then the system returns to step 332 to perform an additional operating system, driver, or application install.

If all of the installations are complete, then the system configures the SSGEN software process partition active and bootable and marks the target partition as inactive at step 340. Next, the system reboots the computer and reenters control of the SSGEN system at step 342. Next, the newly setup target partition is imaged and copied to a server such as the software install file server 142 at step 344.

Figure 4:
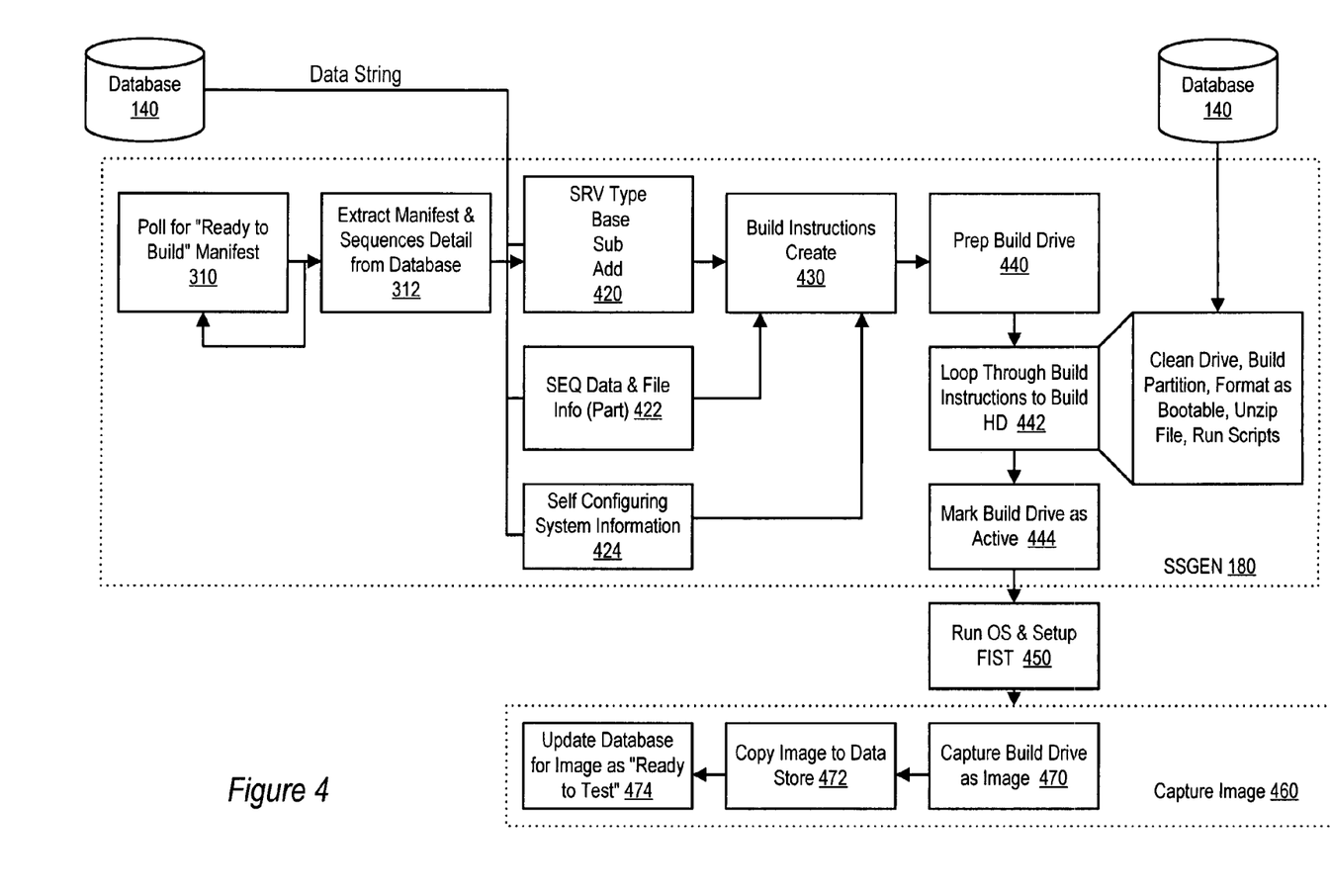
FIG. 4 shows a process flow for the software stack generator machine.

Referring to FIG. 4, a process flow for the software stack generator machine is shown. More specifically, the SSGEN machine 180 polls for manifests at step 310. The SSGEN machine then extracts manifest information and sequences detail from the database 140 at step 312 via a data string. The manifest information includes SRV type information 420, SEQ data and file information and infopart information 422 as well as self configuring system information 424. The SRV type information may include whether a piece of software is a base type, a sub type or an add type. A base type of software is preconfigured static software. An add type of software is software that may be installed and configured. A sub type of software is software that is already installed on the system and can be uninstalled during the self configuration of the system.

The software stack generator machine 180 uses this information to create build instructions as step 430. The software stack generator machine 180 then prepares a build drive within the software stack generator machine 180 at step 440. The software stack generator machine then loops through the build instructions to build a software stack for a hard drive at step 442 from software that is stored within a database such as database 140. The looping includes cleaning the drive of any extraneous information, building a partition on the drive, formatting the drive as bootable, decompressing (e.g., unzipping) the install software and executing scripts to install the software. After all of the software from the manifest is installed, then the software stack generator machine 180 identifies the drive as active at step 444.

Next the target operating system is executed and setup and configured at step 450. The operating system set up may be executed within the factory. Alternately, if the operating system is a fixed image, then the operating system set up may be executed at a customer location.

Next the process enters an image capture portion 460. During the image capture portion, the build drive is captured as an image at step 470. The captured image is then copied to a data store at step 472. The database is then updated to identify the copied image as ready to test at step 474.

Figure 5:
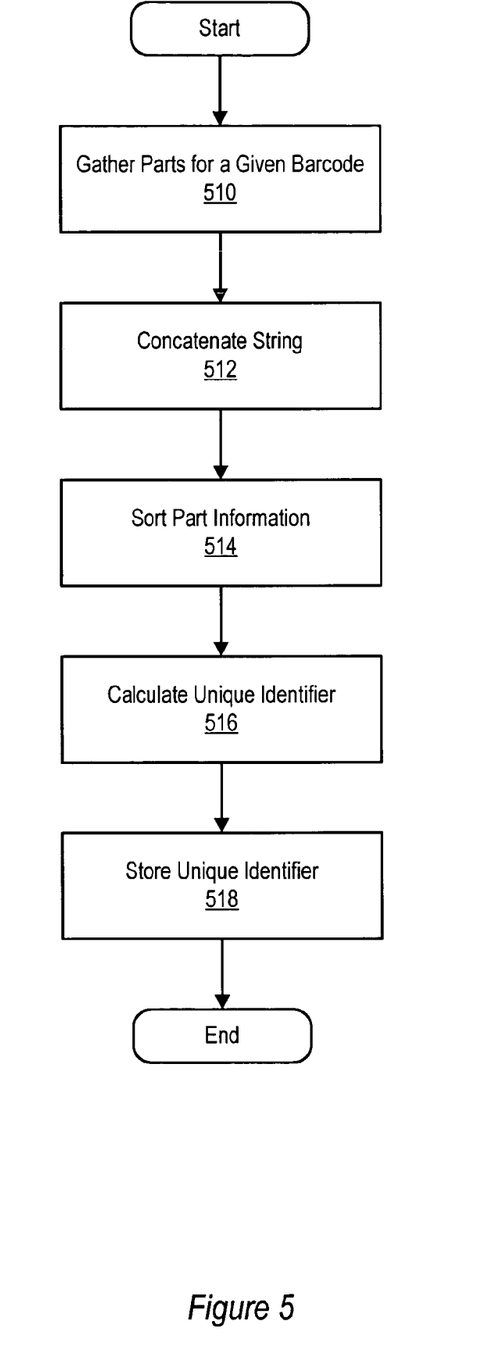
FIG. 5 shows a flow chart of the operation of a system for identifying unique orders.

When creating the software stacks, it is desirable to create stacks for the combinations of software that are most often ordered. Accordingly, it is desirable to identify unique orders so that the combinations of software that are most frequently ordered can be prioritized when creating the software stacks. FIG. 5 shows one example of the operation of the system for calculating and identifying unique orders 260. More specifically, the system for calculating and identifying unique orders 260 starts operation by gathering the part information for a given system barcode at step 510. The part information includes software part information and hardware part information. The software part information includes the software part (referred to as an SRV) and a part number that functions as a passed parameter to a software part (referred to as the infopart) for the software. Infoparts perform functional variations based upon the existence of an infopart in the order. The hardware part information includes the item, the sequence number and the detailed description of the hardware. The sequence number represents the slot of the hardware part. The sequence number is present when more than one of the same hardware component is present in a system (e.g., more than one hard drive, memory chip NIC card, etc. in a system).

After the part information is gathered at step 510, then the system concatenates a string containing all of the part information for a given order type at step 512. The given order type includes hardware order information, software order information, informational order information and base part order information. More specifically, the software order information includes the SRV of the order, the information order information includes the infopart, the hardware order information includes the item, sequence number and detailed description and the base part order information includes images of the SRVs contained within the base parts list.

After the string is concatenated at step 512, the string of part information is sorted at step 514. The string of part information is sorted by any known consistent sorting routine such that the part information is presented in a consistent order across the part information records.

After the string of part information is sorted at step 514, a unique order information value is calculated for the sorted string of part information. The unique order information value is calculated, for example, by calculating a unique integer for each type of unique order information. More specifically, a cyclical redundancy checking (CRC) algorithm is applied to the sorted part information and an integer value is provided by the algorithm.

The CRC algorithm may be any known CRC algorithm. Known CRC techniques ensure the accuracy of transmitting digital data. The transmitted digital data messages are divided into predetermined lengths which, used as dividends, are divided by a fixed divisor. The remainder of the calculation is appended onto and sent with the message. Upon receipt of the transmitted digital data message, the remainder is recalculated. If the remainder does not match the transmitted remainder, an error is detected. In the preferred embodiment, the CRC algorithm is used to calculate a unique order information value which reflects unique sorted part information.

After the unique order information value is calculated, this value is stored within the manufacturing database server 252 at step 518. The unique order information value is associated with an associated barcode. Storing the unique information value in the database server 252 at the barcode level facilitates and speeds analysis of groupings, averages, sums etc. of the unique order information because the number of records in the groups is significantly less at the barcode level than at the individual part per barcode level.

Figure 6:
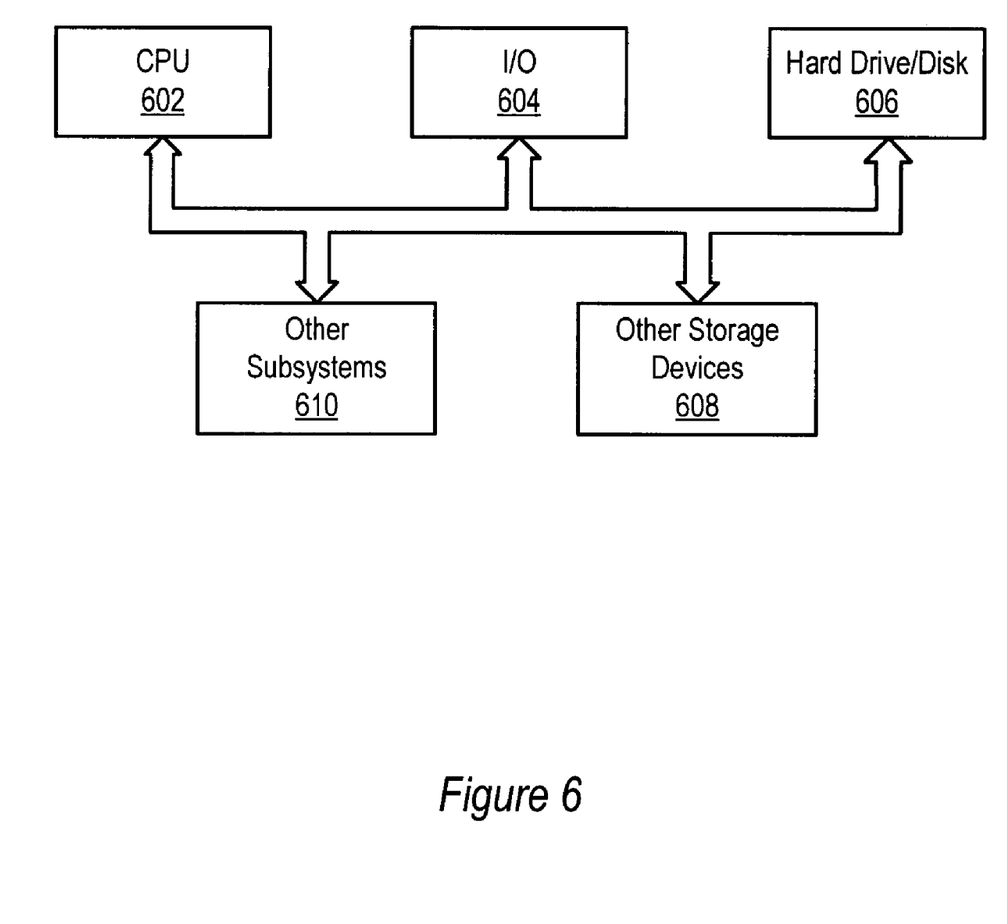
FIG. 6 shows a system block diagram of an information handling system having a unique order configuration.

Referring to FIG. 6, a system block diagram of an information handling system 600 which has parts installed which are identified by the unique order information is shown. The information handling system includes a processor 602, input/output (I/O) devices 604, such as a display, a keyboard, a mouse, and associated controllers, a hard disk drive 606, and other storage devices 608, such as a floppy disk and drive and other memory devices, and various other subsystems 610, all interconnected via one or more buses 612. The software that is installed according to the unique order information methodology is installed onto hard disk drive 606. Alternately, the software may be installed onto any appropriate non-volatile memory. The non-volatile memory may also store the information relating to which unique parts were installed on the information handling system. Accessing this information enables a user to have additional systems corresponding having the unique part combinations to be built.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

OTHER EBMODIEMNTS

Other Embodiments are Within the Following Claims.

For example, the above-discussed embodiments include software modules that perform certain tasks. The software modules may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for automatically generating a software stack in an information handling system, the information handling system including a software process partition, the method comprising:

generating a manifest identifying software stack components;

creating a target partition within the information handling system;

installing the software stack components identified by the manifest into the target partition;

configuring the target partition as active and bootable and the software process partition as hidden;

booting into the target partition;

setting up and configuring the software stack components within the target partition; and, configuring the software process partition as active and bootable and the target partition as inactive, the configuring the software process partition as active and bootable occurring after setting up and configuring the software stack components within the target partition; and wherein the installing includes reading target operating system information from the manifest and executing target operating system scripts based upon the target operating system information.

2. The method of claim 1, further comprising:

the manifest is generated based upon identification of unique orders.

3. The method of claim 1, wherein: the installing further includes rebooting the information handling system after executing the target operating system scripts, entering a setup portion of the target operating system and performing an install of the target operating system.

4. The method of claim 3, wherein:
the installing further includes performing an application install and rebooting the information handling system as needed for the application install.

5. The method of claim 4, wherein:
the installing further includes determining whether additional application installs are present based upon the manifest and if so, performing the additional application installs and rebooting the information handling system as needed for the additional application installs.

6. The method of claim 3, wherein:
the installing further includes performing a device driver install and rebooting the information handling system as needed for the device driver install.

7. The method of claim 6, wherein:
the installing further includes determining whether additional device driver installs are present based upon the manifest and if so, performing the additional device driver installs and rebooting the information handling system as needed for the additional device driver installs.

8. An apparatus for automatically generating a software stack in an information handling system, the information handling system including a software process partition, the apparatus comprising:
means for generating a manifest identifying software stack components;
means for creating a target partition within the information handling system;
means for installing the software stack components identified by the manifest into the target partition;
means for configuring the target partition as active and bootable and the software process partition as hidden;
means for booting into the target partition;
means for setting up and configuring the software stack components within the target partition; and,
means for configuring the software process partition as active and bootable and the target partition as inactive, the configuring the software process partition as active and bootable occurring after setting up and configuring the software stack components within the target partition; and wherein
the means for installing includes means for reading target operating system information from the manifest and means for executing target operating system scripts based upon the target operating system information.

9. The apparatus of claim 8, further comprising:
the manifest is generated based upon identification of unique orders.

10. The apparatus of claim 8, wherein:
the means for installing further includes means for rebooting the information handling system after executing the target operating system scripts, means for entering a setup portion of the target operating system and means for performing an install of the target operating system.

11. The apparatus of claim 10, wherein:
the means for installing further includes means for performing an application install and means for rebooting the information handling system as needed for the application install.

12. The apparatus of claim 11, wherein:
the means for installing further includes means for determining whether additional application installs are present based upon the manifest and means for performing the additional application installs and rebooting the information handling system as needed for the additional application installs.

13. The apparatus of claim 10, wherein:
the means for installing further includes means for performing a device driver install and means for rebooting the information handling system as needed for the device driver install.

14. The apparatus of claim 13, wherein:
the means for installing further includes means for determining whether additional device driver installs are present based upon the manifest, means for performing the additional device driver installs and means for rebooting the information handling system as needed for the additional device driver installs.

15. A computer system for automatically generating a software stack in an information handling system, the information handling system including a software process partition, the system comprising:
a processor;
a generating module, the generating module executing on a processor to generate a manifest identifying software stack components;
a creating module, the creating module executing on a processor to create a target partition within the information handling system;
an installing module, the installing module executing on a processor to install the software stack components identified by the manifest onto the target partition; and
a target configuring module, the target configuring module executing on a processor to configure the target partition as active and bootable and the software process partition as hidden;
a booting module, the booting module executing on a processor to boot into the target partition;
a setup and configuring module, the setup and configuring module executing on a processor to set up and configure the software stack components within the target partition;
a software stack configuring module, the software stack configuring module executing on a processor to configure the software process partition as active and bootable and the target partition as inactive, the configuring the software process partition as active and bootable occurring after setting up and configuring the software stack components within the target partition; and wherein
the installing module reads target operating system information from the manifest and executes target operating system scripts based upon the target operating system information.

16. The computer system of claim 15, further comprising: the manifest is generated based upon identification of unique orders.

17. The computer system of claim 15, wherein: the installing module reboots the information handling system after executing the target operating system scripts, enters a setup portion of the target operating system and performs an install of the target operating system.

18. The computer system of claim 17, wherein: the installing module performs an application install and reboots the information handling system as needed for the application install.

19. The computer system of claim 18, wherein: the installing module determines whether additional application installs are present based upon the manifest, performs the additional application installs and reboots the information handling system as needed for the additional application installs.

20. The computer system of claim 17, wherein: the installing module performs a device driver install and reboots the information handling system as needed for the device driver install.

21. The computer system of claim 20, wherein: the installing module determines whether additional device driver installs are present based upon the manifest, performs the additional device driver installs and reboots the information handling system as needed for the additional device driver installs.

22. An information handling computer system comprising for automatically generating a software stack, the information handling computer system including, the computer system comprising:

a processor;

memory coupled to the processor, the memory including a software process partition and a target partition;

a generating module, the generating module generating a manifest identifying software stack components;

an installing module, the installing module installing the software stack components identified by the manifest into the target partition;

a target configuring module, the target configuring module configuring the target partition as active and bootable and the software process partition as hidden;

a booting module, the booting module booting into the target partition;

a setup and configuring module, the setup and configuring module setting up and configuring the software stack components within the target partition; and, a software stack configuring module, the software stack configuring module configuring the software process partition as active and bootable and the target partition as hidden, the configuring the software process partition as active and bootable occurring after setting up and configuring the software stack components within the target partition; and wherein the installing module reads target operating system information from the manifest and executes target operating system scripts based upon the target operating system information.

* * * * *